(12) United States Patent
Del Hoyo

(10) Patent No.: US 7,588,147 B2
(45) Date of Patent: Sep. 15, 2009

(54) CARRIER STRIP FOR NAILS OR OTHER SECURING ELEMENTS

(76) Inventor: Iñaki Diez Del Hoyo, Estraunza 6, 7ªIzda., E-48011 Bilbao (ES)

( * ) Notice: Subject to any disclaimer, the term of this patent is extended or adjusted under 35 U.S.C. 154(b) by 0 days.

(21) Appl. No.: 11/630,782

(22) PCT Filed: Jun. 24, 2004

(86) PCT No.: PCT/SE2004/000298

§ 371 (c)(1), (2), (4) Date: Oct. 5, 2008

(87) PCT Pub. No.: WO2006/010776

PCT Pub. Date: Feb. 2, 2006

(65) Prior Publication Data

US 2009/0120818 A1 May 14, 2009

(51) Int. Cl.
B65D 85/24 (2006.01)
(52) U.S. Cl. ...................... 206/338; 411/443
(58) Field of Classification Search ........... 206/338, 206/343, 344, 345, 346, 347; 411/443, 447, 411/448

See application file for complete search history.

(56) References Cited

U.S. PATENT DOCUMENTS

| 5,069,340 | A | * | 12/1991 | Ernst et al. | 206/347 |
| 5,931,622 | A | * | 8/1999 | Gupta et al. | 411/443 |
| 6,135,278 | A | * | 10/2000 | Rohrmoser et al. | 206/347 |
| 6,272,814 | B1 | * | 8/2001 | Ikuta et al. | 53/473 |
| 2003/0136693 | A1 | * | 7/2003 | Gupta | 206/343 |

* cited by examiner

Primary Examiner—Jacob K Ackun, Jr.
(74) Attorney, Agent, or Firm—Browdy and Neimark, P.L.L.C.

(57) ABSTRACT

A carrier strip (1) for nails (3) or other securing elements to feed an automatic nailing machine, which is characterized by a series of cartridges (2), whereby each cartridge (2) holds a nail (3). The cartridges (2) have a cylindrical central body (4) finished off at the ends by a wider base (6) and crown (7), with a special feature in which the transition between the central body (4) and the base (6) and crown (7) is carried out by conic geometry. Furthermore, the vertical reinforcement of the cartridge (2) is provided by two lateral pillars (5), parallel to the longitudinal axis (18) of the central body (4), which links the base (6) and the crown (7) without coming into contact with the central body (4).

5 Claims, 2 Drawing Sheets

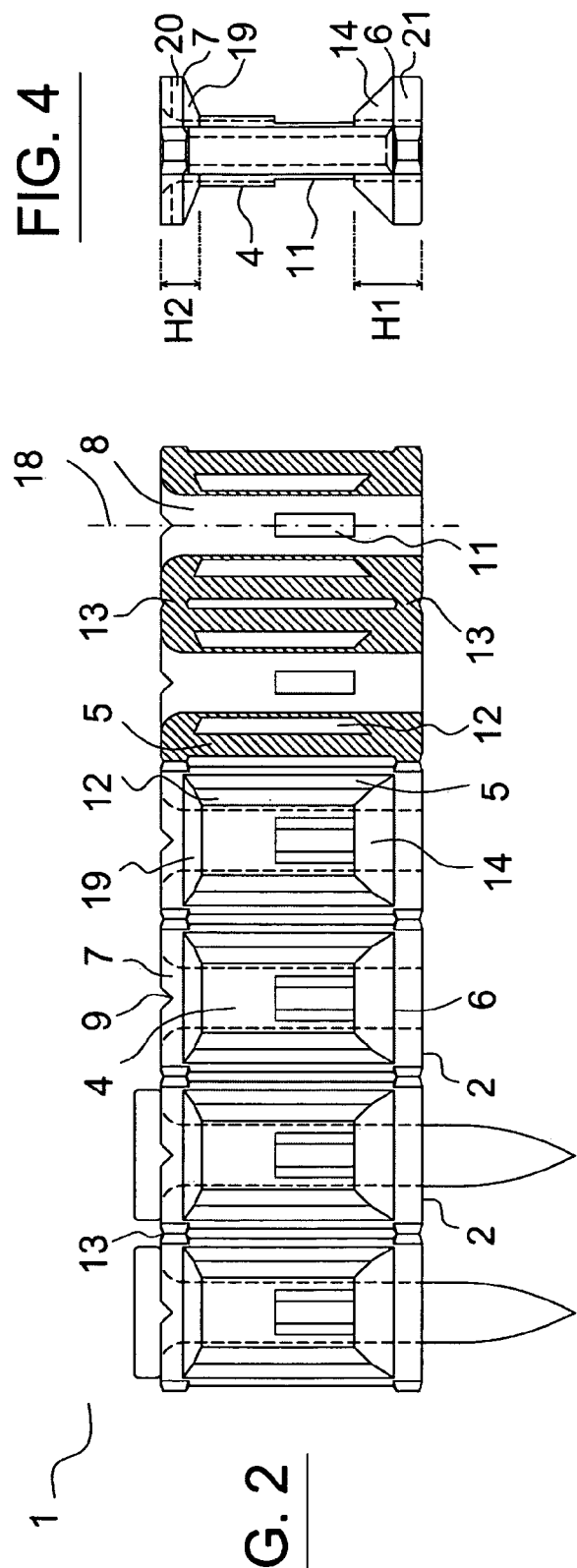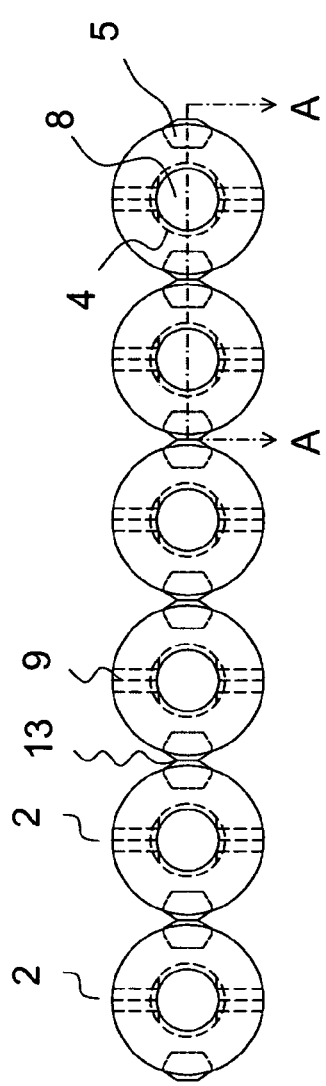

CARRIER STRIP FOR NAILS OR OTHER SECURING ELEMENTS

FIELD OF THE INVENTION

The invention relates to a carrier strip for nails or other similar securing elements, for use in an automatic nailing machine into which nails are fed by means of a continuous nail carrier strip.

PRIOR ART

The operation of automatic nailing machines is based on the pressurized nailing or automatic release of nails or other securing elements, which are individually and progressively fed to the release area of the machine by means of a carrier strip for nails.

In the prior art, numerous types of carrier strips for nails or other securing elements are known, ranging from the simplest flat strips which transport nails that cross the separated strip at a regular distance, to more complex strips consisting of a series of essentially cylindrical cartridges including more or less reinforcement elements, in which each cartridge holds a nail and is secured to the adjacent cartridges by certain securing devices.

The release mechanism of the automatic nailing machine which uses carrier strips consisting of cartridges can be divided into approximately three steps. First of all, the cartridge containing the nail which is going to be released is separated from the belt. Secondly, the cartridge is moved along the release gun to the area closest to the exit. Finally, the machine releases the nail, and the nail crosses and breaks the cartridge, taking a piece of the lower part of the cartridge with it, which remains attached to the nail and performs the function of a washer.

Carrier strips formed by cartridges generally need to meet diverse elasticity and resistance requirements. Therefore, the cartridge strips and the cartridges need to be rigid and should not bend excessively in a direction perpendicular to the direction of the strip (i.e. a direction with a rotation axis perpendicular to the direction of the strip and the substantially cylindrical cartridge axis), a quality which will be called "vertical rigidity". On the other hand, although there is vertical rigidity, the cartridges must also be able to break appropriately. Furthermore, the carrier strip must have significant flexibility in a direction perpendicular to the axis of the strip and have a rotation axis parallel to the axis of the substantially cylindrical cartridge, a quality which will be called 'horizontal flexibility'. Horizontal flexibility is interesting so that the strip can be used in nailing machines with a curved charger.

Strips of nails are know in which the cartridges comprise a central body whose ends both terminate in wider covers, whereby all of these elements are crossed by the nail, and a greater or lesser number of reinforcements are included providing the cartridge with strength. For example, documents U.S. Pat. Nos. 6,044,972 and 6,135,278 present two nail strip designs comprising cartridges with a central body in which the reinforcements are made in the form of nervures or beams essentially horizontally arranged, specifically reinforcing the connection between each cover and the central body. This reinforcement can be improved because although it provides appropriate vertical rigidity, it uses an excessive amount of material which increases the manufacturing cost of the carrier strip.

Document US 2003/0136693 A1 presents another type of nail strip in which there is no central body, instead the cartridge essentially consists of two rings which hold the nail and are interlinked by two lateral pillars that, in addition to completing the cartridge structure, are in contact with the nail. This system presents an important disadvantage: as there is no central body, there is no nail guide in the entire central area between rings and therefore as the nail advances, it may turn and hence fail to be introduced correctly in the cartridge during the assembly phase.

The main objective of the invention is to obtain a carrier strip for nails or other securing elements, comprising a series of cartridges, which improves the guiding of the nail into the cartridge, improves the vertical rigidity of the cartridges, and guarantees the horizontal flexibility of the strip, all of which using less material with respect to known designs in order to make the manufacture of the strip more economical and to simplify the assembly of the nails inside the cartridges.

Another objective of the invention is to obtain a cartridge design which entails greater manufacturing simplicity, avoiding as far as possible the use of abrupt shapes or silhouettes, brusque section changes, etc.

Another objective of the invention is to improve the adaptation of the nail or securing element to the cartridge, so that the cartridge presents a geometry or profile similar to that of the nail.

DETAILED DESCRIPTION OF THE INVENTION

In order to achieve the aforementioned objectives, a carrier strip for nails (or other similar securing elements equipped with a head and point) is defined, in which the strip comprises a number of cartridges arranged in series and successively interlinked, each cartridge holding a nail or securing element. The cartridge mainly consists of a preferably cylindrical central body arranged around a central longitudinal axis, in which this central longitudinal axis is. perpendicular to the direction of the carrier strip. The central body is finished off on its upper side by a cover or crown and on its lower side by another cover or base, whereby the crown and the base are concentric to the central body and have a greater surface area. Both the crown and the central body and the base are crossed by a central passage gap, centred with respect to the longitudinal axis, and whose function is to hold the nail. To provide this function, the central passage gap has a diameter greater or equal to that of the tip of the nail and lower than that of the head of the nail.

The innovations of the carrier strip according to the invention lie in certain aspects of the cartridges which make up the strip.

First of all, both the base and the crown are divided into a non-conical area, or cylindrical area, and a conical area, whereby the conical area is the closest to the central body, in such a way that the conical area serves as the transition area between the central body and the non-conical or cylindrical area of the crown or base. With this conical area, the manufacturing process is favoured and the breakage of the cartridge is simplified, as the cartridge has sections of a progressive size rather than brusque section changes.

Secondly, the height of the crown is lower than the height of the base, or in other words, the total height total of the non-conical and conical areas of the crown is greater than the total height total of the non-conical and conical areas of the base. It has been proven that using a larger base, the cartridge performance is improved in relation to the correct breakage of the crown combined with the correct operation of the base as a washer.

Additionally, the cartridge includes some lateral reinforcement pillars arranged parallel to the longitudinal axis of the cartridge and which connect the crown to the base, without coming into contact with the central body of the cartridge. In this way, through a single reinforcement element, the sturdiness of the crown and the base is improved, and hence the cartridge, without reinforcing its connection to the central body but rather by reinforcing its inter-connection. Furthermore, the lateral pillars reduce the amount of material used whilst maintaining the vertical rigidity of the cartridge and simplify the breakage of the cartridge, as in the latter case, they warp in the presence of increased pressure, and therefore provide a cleaner break.

The lateral pillars have a section almost in the shape of a trapezium. In this way, it is easier to turn out the cartridge during the manufacturing process, simplifying this process. Furthermore, given that the pressure on the cartridge is distributed by moments and therefore the effort is greater in the radially exterior area of the pillar than in the radially interior area of the pillar, the section in the shape of a trapezium distributes the material analogically to the distribution of effort, optimizing the performance of the material used.

On the other hand, in order to improve the positioning of the nail in the cartridge, the opening of the central passage gap to the external surface of the crown (surface which is closest to the head of the nail when it is introduced into the cartridge) is tapered. In this way, if the transition between the head and the tip of the nail is not right-angled but rather is curved or bevelled, an equally valid contact between the nail head and the external surface of the crown of the cartridge will be achieved.

In the central body of the cartridge, at least two windows or openings are made on a plane parallel to the longitudinal axis of the cartridge, whereby these windows are diametrically opposite with respect to the longitudinal axis, in such a way that they are opposite each other, giving the impression of a passage gap. The purpose of these windows is to simplify the breakage of the cartridge. Furthermore, the adjacent location to the base promotes the fact that the breakage of the cartridge ends at the base and this may be detached without breaking to operate as a washer.

In addition to the aforementioned innovations, the cartridge according to the invention has two angled recesses on the external surface of the crown, whose purpose is to facilitate the breakage of the cartridge: These recesses are known in the prior art.

BRIEF DESCRIPTION OF FIGURES

The details of the invention are appreciated in the accompanying figures, which do not intend to limit the scope of the invention:

FIG. 2 shows a front view of the strip of nails of FIG. 1, with a certain part represented in cross-section according to the A-A section plan of FIG. 3.

FIG. 3 shows a bottom view of the strip of nails of FIG. 2.

FIG. 4 represents a side view of the strip of nails of FIG. 2.

FIG. 1 shows the strip of nails (1) according to the invention and used to feed an automatic mailing machine. As can be seen in the figure, the strip of nails (1) consists of a series of cartridges (2) arranged in series and interlinked, holding a securing element or nail (3) inside each cartridge (2). The connection between cartridges (2) is made via connecting lugs (13) which jut out from each cartridge (2) and which coincide with and are secured to the connecting lugs (13) of the adjacent cartridges (2).

Figure 1:
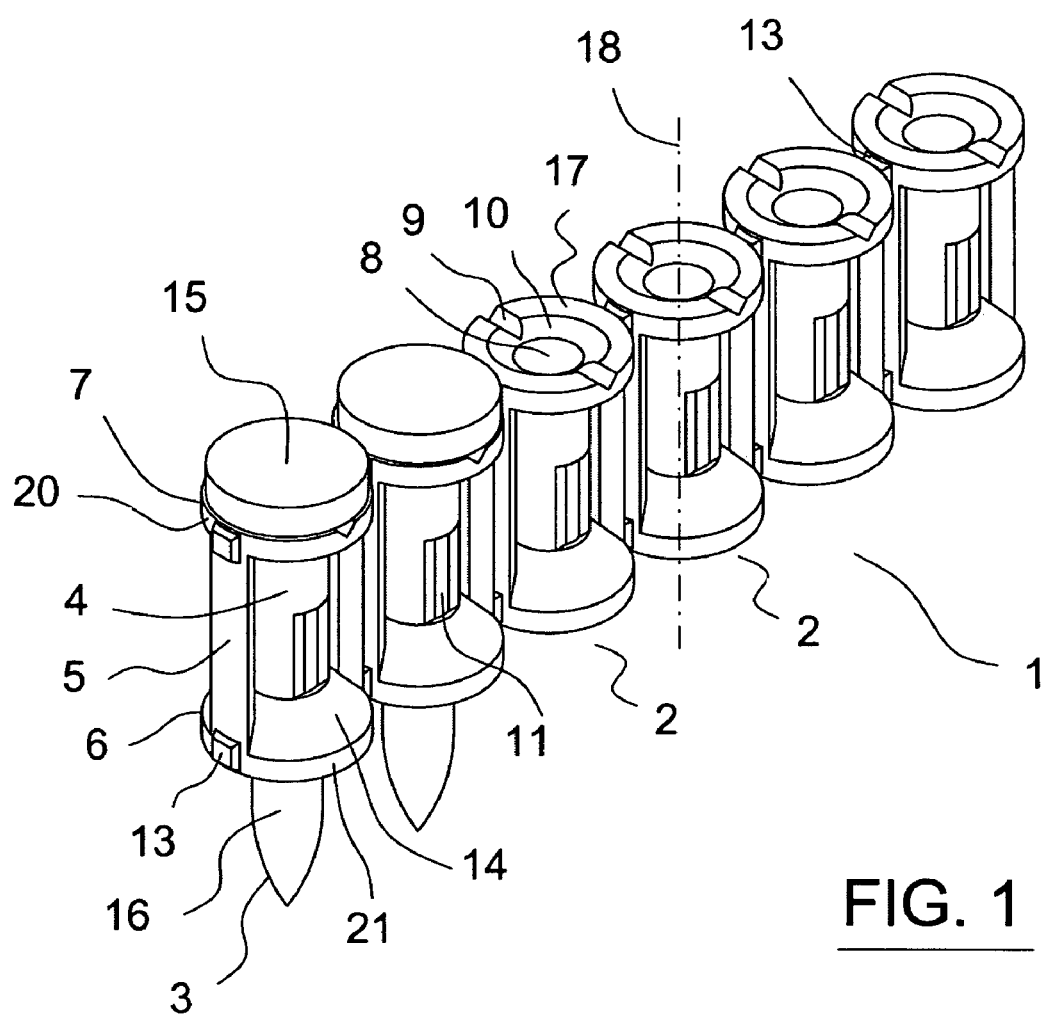
FIG. 1 shows a perspective of the preferred embodiment of the strip of nails according to the invention.

The main structure of each cartridge (2) is defined by a central cylindrical body (4) finished off by a base (6) at its lower end and a crown (7) at its upper end, whereby the base (6) and the crown (7) have a larger diameter than the central body (4). The base (6) consists of a cylindrical area (21) and a conical area (14), the latter being adjacent to the central body (4). Analogously, the crown (7) consists of a cylindrical area (20) and a conical area, not seen in the figure, whereby this latter area is adjacent to the central body (4). As an additional reinforcement, the cartridge (2) is equipped with two lateral pillars (5) arranged between the base (6) and the crown (7), parallel to the longitudinal axis (18) of the cartridge (2), and without coming into contact with the central body (4).

In order to allow the passage of the nail (3), the cartridge (2) is entirely crossed by a central passage gap (8), whose transversal section is smaller than that of the head (15) of the nail (3) and greater or equal to that of the tip (16) of the nail (3). In this way, when the nail (3) is located in the cartridge (2), the head (15) of the nail is located on the external surface (17) of the crown (7) of the cartridge, whilst the tip (16) juts out under the base (6) of the cartridge.

On the other hand, the cartridge (2) has some recesses (9) on the external surface (17) of the crown (7). Furthermore, the outlet of the central passage gap (8) on this external surface (17) is tapered (10), which allows the correct positioning of the nail (2), as can be seen in the following figures.

Furthermore, the central body (4) of the cartridge (2) is open laterally in the part nearest to the base (6). This opening is specifically made in the shape of two diametrically opposite rectangular windows (11), leaving an opening or passage orifice transversal or perpendicular to the axis (18) of the cartridge (2).

FIG. 2 shows a front view of the strip of nails (2) in which two cartridges (2) have been represented in section for explanatory purposes, specifically in a section made by the A-A plane represented in FIG. 3.

As previously explained, the cartridge (2) is structured mainly around the central body (4) finished off by the crown (7) and the base (6), wider and more equipped than the conical areas (19, 14), and reinforced by the lateral pillars (5) arranged parallel to the longitudinal axis (18) of the cartridge (2). In the partial section, it can be clearly seen that the lateral pillars (5) link the base (6) and the crown (7) without coming into contact with the central body (4), or in other words, leaving a determined space (12) with respect to the central body (4).

In the partial cross-section, the central passage gap (8) in the central body (4) of the cartridge (2) and in the direction of the longitudinal axis (18) is clearly shown. Inside this central passage gap (8), as well as on the exterior of the central body (4), the windows (11) which are diametrically opposite with respect to the longitudinal axis (18) can be seen.

FIG. 3 shows the lower view of the strip of nails of FIG. 2. This view appreciates that the strip of nails (1) according to the invention is a succession or series of interlinked cartridges (2) by means of connecting lugs (13) of a qualitatively small size in relation to that of the cartridges. In this way, the strip has greater horizontal flexibility and may be used in nailing machines with a curved charger.

In addition to the other characteristic or elements mentioned in the previous figure, this figure shows a transversal view of the lateral pillars (5) which enables their almost trapezoidal section to be observed.

FIG. 4 shows a side view of the nail strip of FIG. 2, in which it is appreciated that the height (H1) of the base (6), consisting of the cylindrical area (21) and the conical area (14), is greater than the height (H2) of the crown (7), consisting of the cylindrical area (20) and the conical area (19). The central body (4), with a smaller diameter than the base (6) and the crown (7), is also slightly narrower in the area of the facing windows (11).

The invention claimed is:

1. Carrier strip (1) for nails (3) or other securing elements equipped with a head (15) and tip (16), in which the carrier strip (1) comprises a series of cartridges (2) arranged in series and successively interlinked, whereby each cartridge (2) holds a nail (3) or securing element, and where the cartridge (2) consists of a central body (4) arranged around a central longitudinal axis (18) perpendicular to the direction of the carrier strip (1), whereby the central body (4) is finished off on its upper side by a cover or crown (7) and on its lower side by another cover or base (6), whereby the crown (7) and the base (6) are concentric to the central body (4) and have a greater surface area, where both the crown (7) and the central body (4) and the base (6) are crossed by a central passage gap (8), centred with respect to the longitudinal axis (18), inside which is the nail (3), being the carrier strip (1) characterized in that:

the base (6) and the crown (7) are divided into a non-conical area (21, 20), and a conical area (14, 19), whereby the conical area (14, 19) is closest to the central body (4), in such a way that the conical area (14, 19) serves as a transition area between the central body (4) and the non-conical area (21, 20) of the crown (7) or base (6), the height (H2) of the crown (7) is lower than the height (H1) of the base (6), the cartridge (2) includes at least two lateral reinforcement pillars (5), arranged parallel to the longitudinal axis (18) of the cartridge (2), which connect the crown (7) to the base (6) without coming into contact with the central body (4) of the cartridge (2), the opening of the central passage gap (8) on the external surface of the crown (7), or surface which is nearest to the head (15) of the nail (3) when introduced into the cartridge (2), is tapered, in the central body (4) of the cartridge (2) at least two windows (11) or openings are made on a plane parallel to the longitudinal axis (18) of the cartridge (2), whereby these windows (11) are diametrically opposite with respect to the longitudinal axis (18), in such a way that they are opposite each other, giving the impression of a passage gap.

2. Carrier strip (1) for nails (3) or other securing elements, according to claim 1, characterized in that the central body (4) of the cartridge (2) is cylindrical.

3. Carrier strip (1) for nails (3) or other securing elements, according to claim 1, characterized in that the non-conical area (21) of the cartridge base (6) is cylindrical.

4. Carrier strip (1) for nails (3) or other securing elements, according to claim 1, characterized in that the non-conical area (20) of the cartridge crown (7) is cylindrical.

5. Carrier strip (1) for nails (3) or other securing elements, according to claim 1, characterized in that the lateral pillars (5) have a cross-section which is approximately in the shape of a trapezium.

* * * * *